United States Patent [19]

Fergason et al.

[11] Patent Number: 5,300,145
[45] Date of Patent: Apr. 5, 1994

[54] LOW AMYLOPECTIN STARCH

[75] Inventors: Virgil Fergason, Decatur, Ill.; Roger Jeffcoat, Bridgewater, N.J.; John E. Fannon, Somerville, N.J.; Teresa Capitani, Clark, N.J.

[73] Assignee: National Starch and Chemical Investment Holding Corporation, Wilmington, Del.

[21] Appl. No.: 937,794

[22] Filed: Aug. 28, 1992

[51] Int. Cl.$^5$ .................. C08L 3/02; C09D 103/02
[52] U.S. Cl. .................................. 106/213; 106/210; 536/102; 127/29; 127/65
[58] Field of Search ............... 536/102; 106/210, 213; 127/29, 65

[56] References Cited

U.S. PATENT DOCUMENTS

| | | | |
|---|---|---|---|
| 3,728,140 | 4/1973 | Yoshida | 106/210 |
| 3,734,760 | 5/1973 | Hijiya et al. | 106/210 |
| 4,428,972 | 1/1984 | Wurzburg et al. | 426/578 |
| 4,770,710 | 9/1988 | Friedman et al. | 426/578 |
| 4,789,557 | 12/1988 | Friedman et al. | 426/578 |
| 4,789,738 | 12/1988 | Friedman et al. | 536/102 |
| 4,790,997 | 12/1988 | Friedman et al. | 426/578 |
| 4,792,458 | 12/1988 | Friedman et al. | 426/578 |
| 4,798,735 | 1/1989 | Friedman et al. | 426/578 |
| 4,801,470 | 1/1989 | Friedman et al. | 426/578 |
| 5,004,864 | 4/1991 | Robertson et al. | 435/172.1 |
| 5,009,911 | 4/1991 | Mauro et al. | 426/578 |
| 5,034,239 | 7/1991 | Mauro et al. | 426/578 |
| 5,035,912 | 7/1991 | Furcsik et al. | 426/578 |

OTHER PUBLICATIONS

Jan H. Schut, "Moldable, Water-Soluble Starch-Based Resin Arrives," *Plastics Technology*, Sep. 1991, pp. 19, 21, 23.

*Corn and Corn Improvement* Third Edition, G. F. Sprague and J. W. Dudley, editors, 1988, pp. 885-886, 897, 911-912.

Hullinger, Clifford H., Van Patten, Eric and Freck, James A., "Food Applications of High Amylose Starches," *Food Technology* Mar. 1973, pp. 22, 24.

J. A. Cura, et al., *Starch/Starke* 42 (1990) Nr. 5, pp. 171-175.

C. R. Krisman, et al., *Starch/Starke* 43 Nr. 8, pp. 291-294 (1991).

J. B. South, et al., *Journal of Cereal Science*, (1991) 14, pp. 267-278.

W. R. Morrion, et al., Chapter 9 in *Methods in Plant Biochemistry*, vol. 2, Academic Press Ltd. (1990) pp. 323-329.

T. Baba, et al., *J. Jpn. Soc. Starch Sci.*, vol. 34, No. 3, pp. 196-202 (1987).

T. Baba, et al., *J. Jpn. Soc. Starch Sci.*, vol. 34, No. 3, pp. 213-217 (1987).

C. Mercier, *Die Strake*, 25 Jahrg, 1973 Nr. 3, pp. 78-82.

C. W. Moore and R. G. Creech, in *Genetics*, 70:611-619, (1972).

*Corn and Corn Improvement*, Third Edition, 1988, G. F. Sprague and J. W. Dudley, Editors, American Society of Agronomy, Madison, Wis., pp. 85-115, 124-125 and 399-407.

Shannon, J. C. and Garwood, D. L., Chapter 3 in *Starch: Chemistry and Technology*, 2nd Ed., Whistler, R. L. BeMiller, J. N., and Paschall, E. F., Eds., Academic Press, Orlando, Fla. (1984), pp. 54-59; A. H. Young, (List continued on next page.)

*Primary Examiner*—David Brunsman
*Attorney, Agent, or Firm*—Mary E. Porter

[57] ABSTRACT

This invention provides a starch derived from a single plant source, comprising less than 10%, optionally less than 5%, amylopectin. The starch additionally comprises at least 75% amylose, optionally at least 85% amylose, measured by butanol fractionation/exclusion chromatography measurement. In another aspect of this invention, the starch is extracted in substantially pure form from a starch bearing plant having a recessive amylose extender genotype that is associated with amylose extender modifying genes. The starch bearing plant from which the starch is extracted is preferably a maize plant.

20 Claims, 1 Drawing Sheet

OTHER PUBLICATIONS

Chapter 8 in *Starch: Chemistry and Technology, Id.*, pp. 249–265, 274–277 and 282.
Banks, W. and C. T. Greenwood: *Carbohydrate Res.* 6 (1968), 241.
Greenwood, C. T. and D. J. Hourston: *Starke 23* (1971), 344.
Greenwood, C. T., and J. Thomson: *Chem. Ind.,* (1960), 1110.
Greenwood, C. T. and J. Thomson: *Biochem, J., 82* (1962), 156.
G. K. Adkins and C. T. Greenwood, *Starke, 18* (1966) 171.
Greenwood, C. T., and S. MacKenzie: *Carbohydrate Res., 3* (1966), 7.
Adkins, G. K., and C. T. Greenwood: *Strake 18* (1966), 237.
Adkins, G. K., and C. T. Greenwood: *Starke 18* (1966), 240.
Adkins, G. K., and C. T. Greenwood: *Carbohydrate Res., 3* (1966), 81.
Adkins, G. K., and C. T. Greenwood: *Carbohydrate Res., 3*(1966), 152.
Banks, W., and C. T. Greenwood: *Carbohydrate Res., 11* (1969) 217.
Adkins, G. K., C. T. Greenwood and D. J. Hourston: *Cereal Chem.,* 47 (1970), 13.
Banks, W., C. T. Greenwood and D. D. Muir: *Starke 23* (1971), 199.
Banks, W., C. T. Greenwood and D. D. Muir: *Starke 26* (1974), 289.

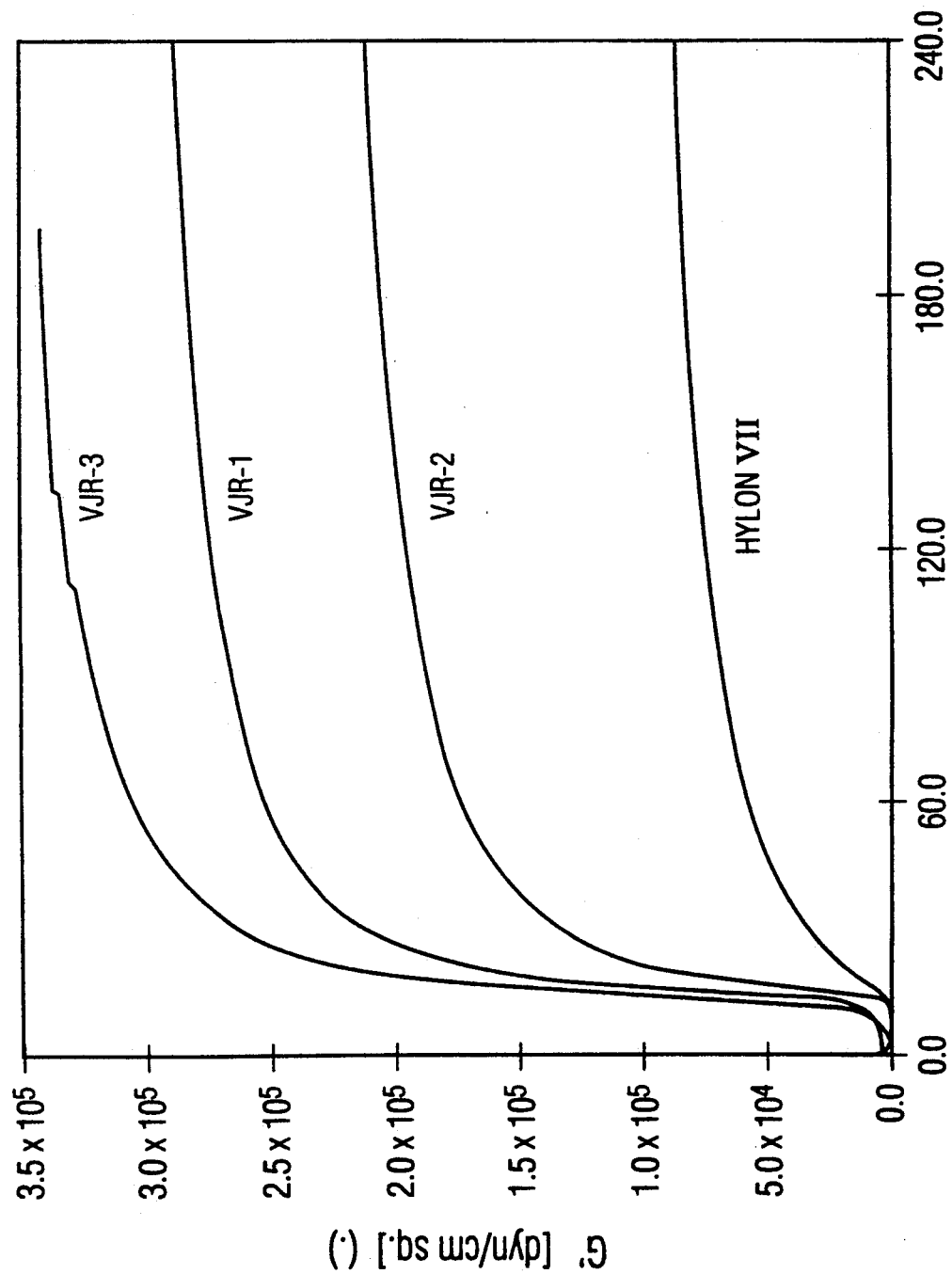

LOW AMYLOPECTIN STARCH

BACKGROUND OF THE INVENTION

This invention relates to a low amylopectin starch having unique molecular and functional characteristics. The starch may be obtained from a number of sources, including a novel corn breeding population comprising germplasm selections which are homozygous for the recessive amylose extender (ae) gene and into which ae modifier genes have been accumulated by recurrent selection.

High amylose starches have been known for many years. Such starches are derived from unique breeding sources, such as high amylose corn inbreds and their hybrids, wrinkled pea cultivars, high amylose barley cultivars, and the like. Starches obtained from these sources have been exploited commercially for their unique functional properties, such as superior film-forming ability, higher cooking temperature, higher gel strength, improved water resistance, and other properties attributed to the higher amylose content, relative to the amylopectin content, of these starches. Amylose is a linear polymer; amylopectin a larger, branched polymer of glucose.

The amylose content of starches obtained from nature varies widely, but remains less than one-third of the total starch content for the majority of starches derived from agricultural crops. The balance of the starch is generally described as amylopectin.

To date, commercially available high amylose starches have been marketed as either 50% amylose or 70% amylose starch. A range of about 40-75% amylose has been reported for commercial products. The existence of high amylose corn starches containing up to 88% amylose has been disclosed in scientific publications. However, it is generally accepted by persons skilled in the art that early methods used to isolate and analyze high amylose starches for amylose content were flawed, and early reports of amylose content in excess of 70% are viewed with skepticism. Amylose content has been described as "apparent amylose" because branched molecules having long outer chains yield an over-estimation of amylose content by potentiometric iodine analysis. See, Shannon, J. C. and Garwood, D. L., Chapter 3 in *Starch: Chemistry and Technology*, 2nd Ed., Whistler, R. L., BeMiller, J. N., and Paschall, E. F., Eds., Academic Press, Orlando, Fla. (1984) pp. 54-59. This publication also suggests that the presence of low molecular weight amylose may result in an underestimation of amylose content. In addition to experimental error, the location of the kernel on the ear, growing conditions, growing location and other plant variables are known to affect amylose content. Adverse growing conditions (e.g., drought) are known to reduce amylose content by as much as 7.7% in starch extracted from the grain of high amylose corn plants. See, e.g., V. L. Fergason, et al., *Crop Sci*, 5:169 (1965).

As more reliable means of analysis have been developed, the commercial high amylose starches derived from corn hybrids have been shown to contain at least 25% amylopectin, and, typically, no more than 75% amylose determined by potentiometric and colorimetric iodine analysis.

In the 1960's and early 1970's, C. T. Greenwood, G. K. Atkins, W. Banks and others, collaborated on a study of the chemical structure of the starches obtained from high amylose plant sources. The work included fractionation of the high amylose corn starch into various molecular components and physical, enzymatic and chemical analyses of the fine structure of the starch. No exclusion chromatography or other, similar, molecular weight analyses of amylopectin content were reported. The collaborators used commercially available starches having an "apparent amylose" content of about 50-75%. Their work is reported in the following publications:

Greenwood, C. T., and J. Thomson: *Chem. Ind.* (1960), 1110;

Greenwood, C. T., and J. Thomson: *Biochem. J.* 82 (1962), 156;

G. K. Adkins and C. T. Greenwood, *Starke*, 18 (1966) 171;

Greenwood, C. T., and S. MacKenzie: *Carbohydrate Res.* 3 (1966), 7;

Adkins, G. K., and C. T. Greenwood: *Starke* 18 (1966), 237;

Adkins, G. K., and C. T. Greenwood: *Starke* 18 (1966), 240;

Adkins, G. K., and C. T. Greenwood: *Carbohydrate Res.* 3 (1966), 81;

Adkins, G. K., and C. T. Greenwood: *Carbohydrate Res.* 3 (1966), 152;

Banks, W., and C. T. Greenwood: *Carbohydrate Res.* 6 (1968), 241;

Adkins, G. K., and C. T. Greenwood: *Carbohydrate Res.* 11 (1969), 217;

Adkins, G. K., C. T. Greenwood and D. J. Hourston: *Cereal Chem.* 47 (1970), 13;

Banks, W., C. T. Greenwood and D. D. Muir: *Starke* 23 (1971), 199;

Greenwood, C. T., and D. J. Hourston: *Starke* 23 (1971), 344; and

Banks, W., C. T. Greenwood and D. D. Muir: *Starke* 26 (1974), 289 (a review of the work in this area).

In their publications, the collaborators identified the presence of a lower molecular weight starch constituent in addition to the normal amylose and amylopectin constituents. The collaborators reported that although the composition of this lower molecular weight fraction was not completely understood or characterized, the fraction appeared to be a low molecular weight, linear, amylose-like component. This fraction formed a complex with iodine that was typical of amylose (and atypical of amylopectin). The collaborators were uncertain as to whether the low molecular weight fraction contained branched molecules. Amylose ("normal amylose") content did not exceed 65%, even in a sample with an "apparent amylose" content of 75%. The collaborators disclosed difficulty in fully solubilizing the high amylose starches. They suggested that the amylose content of the starches reported in the literature had been overstated and noted that the error inherent in iodine affinity measurements of amylose content results in an inability to confirm iodine binding results using measurements by other techniques, such as butanol complexing and fractionation, or enzymatic characterization. However, they concluded from butanol fractionation, iodine binding and enzyme studies that an amylopectin content as low as 4% of the total starch had been observed in a "75% apparent amylose" (65% "normal amylose") starch.

Similar difficulties in measuring amylose content (both in ordinary and high amylose starches) have been reported elsewhere. See, e.g., A. H. Young, Chapter 8 in *Starch: Chemistry and Technology*, supra, pp. 249–265, 274–277 and 282.

It has now been discovered, by using more reliable measuring techniques, (e.g., full starch dispersion followed by butanol fractionation and exclusion chromatography) that a starch containing in excess of 75%, optionally in excess of 85%, amylose (normal amylose), together with about 8 to 25% low molecular weight amylose-like materials and less than 10%, optionally less than 5%, amylopectin may be extracted from a novel corn breeding population having a recessive amylose extender gene. The corn population is a genetic composite comprising germplasm selections which are homozygous for the ae gene and into which ae modifier genes have been accumulated by recurrent selection. The "ae modifier genes" are minor genes which interact epistatically with the ae gene to produce high amylose seed starch. It has been discovered that this "ae starch" has unique functional properties when compared to high amylose starch having 50 or 70% amylose, as well as when compared to ordinary corn starch, or waxy maize (100% amylopectin) starch.

It has further been discovered that if a starch blend is prepared from non-ae starch fractions so as to minic the molecular composition of the ae starch derived from the corn breeding population, then such a starch blend exhibits similar functional benefits in various applications.

Finally, it has been discovered that a starch having in excess of 75% amylose and less than 10% amylopectin has unique functional properties which can be exploited in many commercial applications, where starches and other polysaccharides and polyhydric alcohols traditionally have been used.

SUMMARY OF THE INVENTION

This invention provides a starch derived from a corn breeding population which is a genetic composite of germplasm selections, the starch comprising at least 75% amylose, optionally at least 85% amylose, as measured by butanol fractionation/exclusion chromatography techniques. The starch additionally comprises less than 10%, optionally less than 5%, amylopectin. The starch is preferably extracted in substantially pure form from the grain of a starch bearing plant having a recessive amylose extender genotype coupled with numerous amylose extender modifier genes.

In a preferred embodiment, the starch bearing plant from which the starch is extracted is a corn plant.

In another aspect of this invention, a starch composition is provded which comprises at least 75% amylose, no more than 10% amylopectin and about 8 to 25% low molecular weight amylose, measured by butanol fractionation/exclusion chromatography. Such a starch composition may be obtained from a genetic composite of germplasm selections, or from starch fractions extracted from two or more starch sources and combined in the appropriate ratios.

In a preferred embodiment, the starch consists essentially of 80% amylose, 5% amylopectin and 15% low molecular weight amylose, measured by butanol fractionation/exclusion chromatography, most preferably 87% amylose, 2% amylopectin, and 11% low molecular weight amylose.

The starches of this invention are characterized by rapid gel formation to provide a high strength gel having resilient, elastic characteristics.

BRIEF DESCRIPTION OF THE DRAWINGS

FIG. one is a graph illustrating the rate of gelation and gel stiffness of the starches of this invention. The graph also illustrates the gel characteristics of a commercial 70% amylose corn starch gel control. Descriptions of these samples and the test procedure used to measure gel characteristics are set forth in Example 5.

DESCRIPTION OF PREFERRED EMBODIMENTS

The starch is preferably obtained from the modified ae maize population described herein. However, starches from other plant sources may be suitable for use in this invention, and starch compositions blended or formulated from more than one starch source are also suitable for use herein, provided that the composition is adjusted to the appropriate ratios of amylose, amylopectin and low molecular weight amylose. The ae genotype plant from which the starch is extracted may be obtained by standard breeding techniques, or by translocation, inversion or any other method of chromosome engineering to include variations thereof whereby the properties of the starch of this invention are obtained. Any plant source which produces starch and which can be bred to produce a plant having ae homozygous genotype may be used.

LOW AMYLOPECTIN STARCH

Starch is a polysaccharide typically comprising a mixture of amylose and amylopectin molecules which are organized into compact granular structures. As used herein "starch" refers to starch in its native form as well as starch modified by physical, chemical and biological processes. Amylose is a linear polymer of D-anhydroglucose units which are linked by alpha-1,4-D-glucosidic bonds. Amylopectin is a larger, branched polymer of amylose chains linked by alpha-1,6-D-glucosidic bonds in a tree-like structure. Depending upon the genotype from which the starch is obtained, amylose ordinarily contains between 250 and 12,500 D-anhydroglucose units (gel permeation chromatography ("GPC") peak molecular weight of about 200,000) ("normal amylose"), and amylopectin contains between 400,000 and 3,125,000 D-anhydroglucose units (weight average molecular weight greater than about 1,500,000 by GPC). As used herein, "low molecular weight amylose" refers to substantially linear polymers containing from about 30 to 250 anhydroglucose units (GPC peak molecular weight of about 15,000) primarily linked by alpha-1,4-D-glucosidic bonds.

The term starch as used herein means not only substantially pure starch granules as extracted from a starch bearing plant, but also grain products of the starch granule such as flour, grit, hominy and meal. The starch may be in the form of a granular or a gelatinized starch (a precooked, cold-water-swelling starch).

The starch components which may be used to prepare low amylopectin starch blend compositions may be derived from any source, including corn, potato, sweet potato, wheat, rice, sago, tapioca, waxy maize, sorghum, millet, oat, barley, pea, and the like, and mixtures thereof, and their pregelatinized or thermally processed products. The blend may contain small amounts of other starches, such as modified starches, provided that such starch components do not alter the essential functional and molecular characteristics of the blend.

The low amylopectin starches must contain no more than 10% amylopectin and at least 75% amylose, by weight of starch, as measured by butanol fractionation and exclusion chromatography. The balance is preferably low molecular weight amylose.

For butanol fractionation, the starch is preferably milled from corn kernels in a commercial or pilot scale quantity (e.g., 300 lbs) to obtain a representative sample, the extracted granular starch is defatted and fully solubilized (e.g., by dissolving in dimethyl sulfoxide (DMSO) solvent) to dissolve the starch granules and to fully disperse the starch molecules. The starch is preferably removed from DMSO solution by ethanol precipitation.

Following separation of the starch from the ethanol, the amylose portion of the starch is removed from the amylopectin by complexation with 1-butanol, followed by centrifugation at about 10,000 g, with repeated re-dissolving and re-complexing steps to assure full separation of the amylose fraction. The fractionation is carried out under an inert atmosphere (and after defatting the starch) to avoid starch degradation. The supernatant fractions are collected and the final combined supernatant is treated with ethanol and/or acetone to precipitate the non-complexing starch.

For exclusion chromatography, gel permeation chromatography, as described in the Testing Methods section herein, is preferred for confirming amylose and amylopectin content of low amylopectin starch compositions following butanol fractionation.

Employing these techniques, one skilled in the art may readily identify starches of this invention.

In a preferred embodiment, the low amylopectin starch is obtained from a composite population of the ae germplasm selections disclosed herein. Such "ae starch" comprises at least 75% amylose, no more than 10% amylopectin, and about 8 to 25% low molecular weight amylose. Such "ae starches" optionally comprise at least 85% amylose, no more than 5% amylopectin and 5 to 15% low molecular weight amylose.

In another preferred embodiment, amylose or low molecular weight amylose is added to ordinary starch (e.g., corn) to dilute the amylopectin content. The amylose component(s) are preferably added to a high amylose (i.e., 50 or 70% amylose) starch to minimize amylopectin content. The low molecular weight amylose is preferably obtained by leaching it into aqueous solution from 50 or 70% amylose starch granules. It also may be obtained by enzymatic debranching (e.g., with pullulanase, isoamylase or other enzyme having α-1,6-D-glucosidase activity) of a low amylose starch (e.g., corn or waxy maize starch), followed by removal of any residual branched starch through crystallization or filtration. The short chain amylose product of enzymatic debranching of amylopectin (i.e., having a DP of 15 to 65) is known to rapidly retrograde (crystallize) from aqueous solution or dispersion upon cooling to room or refrigerator temperatures. Methods for enzymatic debranching are known in the art. See, e.g., U.S. Pat. Nos. 4,971,723, issued Nov. 20, 1990 to Chiu; 3,532,475, issued January, 1972 to Sugimoto, et al.; 3,532,602, issued Oct. 6, 1970 to Seidman, et al.; 3,730,840, issued May 1, 1973 to Sugimoto, et al.; 3,879,212, issued Apr. 22, 1975 to Yoshida; and 3,881,991, issued May 6, 1975 to Kurimoto, et al., which are hereby incorporated by reference.

For rapid gelling in aqueous dispersion and gel resilience, less than 5% amylopectin and a higher ratio of amylose to low molecular weight amylose (e.g., at least 80% and less than 12%, respectively) is preferred. The same composition also yields unexpectedly high gel strength, relative to 50 and 70% amylose starches.

For maximum gelation temperature, an amylose content of at least 85% is preferred.

MODIFIED AE CORN PLANT

Many genetic factors in maize (corn) affect the proportion and type of starch and other molecules present in the endosperm of the corn kernel. A detailed description of the origin, inheritance and expression of genes known to affect kernel composition and morphology is given in "The Genetics of Corn" by Coe, E. H., Jr., M. G. Neuffer, and D. A. Hoisington, Chapter 3 of *Corn and Corn Improvement*, Third Edition, 1988, G. F. Sprague and J. W. Dudley, Editors, American Society of Agronomy, Madison, Wisconsin, p. 81–258.

The amylose extender gene is a homozygous recessive allele at locus 5L-57 on chromosome 5 of the corn genome. The ae gene corn mutant was first described by Vineyard, M. L., and R. P. Bear, in *Maize Newsletter* 26:5 (1952), and further described in C. W. Moore and R. G. Creech, in *Genetics*, 70:611–619 (1972), and *Corn and Corn Improvement*, supra, pp. 85–115, 124–125 and 399–407.

The ae corn starch of this invention is extracted from a corn breeding population and has novel functional properties and novel molecular characteristics. The substantially pure starch may be extracted from the grain of any starch-bearing plant in a population which is homozygeous for the ae gene. In a preferred mode, the starch of the present invention is produced by a selected population of dent corn germplasm selections which are homozygous for recessive amylose extender genotype and into which has been accumulated ae modifier genes. Dent corn is the common corn grown in the U.S. for agricultural purposes and is readily distinguished by phenotype and genotype from popcorn, Giant of the Cuzco corn and other corn varieties.

The novel functional characteristics (e.g., rapid gel set) are observed principally in aqueous starch gels comprising water and substantially pure starch extracted from a starch bearing plant having an ae genotype, wherein the gel contains about 1% to 20%, by weight, starch. The novel molecular characteristics are the low amylopectin/amylose ratio and the other unique molecular aspects of the starch which are described below.

The pure starch may be extracted from grain obtained from the modified ae gene corn plant by steeping the kernels of the corn plant in water, grinding the steeped corn kernels and separating the starch from the residue of the ground corn kernels. In a preferred embodiment of this wet milling process, clean grain is steeped in a weak aqueous solution of sulphur dioxide for 24 to 48 hours and temperatures ranging from 48° to 55° C. After the steeping the steepwater is separated and the swollen and softened grain is coarsely ground. This first grind releases the germ that contains most of the corn oil. The germ is then separated and washed in a hydroclone. The separation is based on difference in density between the germ and the rest of the components. Germ is the first by-product.

The rest of the slurry is finely milled to release most of the starch and protein from the fiber. The whole mixture then passes through a fine vibrating screen to separate the fiber from the starch and protein slurry.

The fiber is washed and collected as the second by-product. The mill starch is further processed through a series of small hydroclone assemblies to separate the protein from the starch. The protein is collected as the third by-product and the purified starch which is the final product, is dewatered by centrifugation and dried in a flash dryer.

BREEDING METHOD

A genetic composite of corn (*Zea mays L.*) germplasm selections capable of producing starch with a low amylopectin and high amylose content can be bred by means of accumulating ae modifier genes in a homozygous ae genetic background through recurrent selection. Recurrent selection is a breeding system designed to increase the frequency of genes for particular quantitatively inherited characteristics by repeated cycles of selection. A recurrent selection cycle involves the identification of genotypes superior for the specific quantitative characteristics being improved and subsequent intermating of the superior genotypes to obtain new gene combinations.

In accordance with this approach an ae breeding source is crossed to a wide array of genotypically diverse germplasm. This diverse germplasm serves as a source of the ae modifier genes. The germplasm selected as a source of ae modifier genes can be germplasm grown in the U.S. Corn Belt as well as non-adapted germplasm found outside the United States. The germplasm used as a source of ae modifiers that resulted in the production of genetic composites of Example 1, described in the instant application, was obtained from the corn breeding program of Custom Farm Seed Company, Decatur, Ill.

Seeds produced from crossing an ae corn line to genotypically diverse germplasm are randomly selected. Plants grown from these seeds are self-pollinated over two to three generations and corn kernels from individual plants so-produced are collected. The starch in the collected corn kernels is subjected to chemical analysis using the methods described below to determine amylose content. Plants producing starch with the highest amylose levels are identified and crossed in all combinations. The progeny are selfed over two to three generations and corn kernels from individual plants so-produced are collected. Once again, the starch in the collected corn kernels is subjected to chemical analysis to determine amylose content. Plants producing starch with the highest amylose levels are identified and crossed in all combinations.

A recurrent selection cycle, therefore, consists of the process of selfing over two to three generations, followed by crossing in all combinations, those individual plants producing seed starch which has the highest amylose content. The recurrent selection cycle is repeated until a genetic composite of corn inbreds producing starch having the desired characteristics is obtained. In the case of genetic composite VJR-1, ten recurrent selection cycles were required to obtain a corn population capable of producing starch having the characteristics shown in Tables I-V. That is, starting with a corn population that produced seed starch having 61 to 75% amylose, 10 recurrent selection cycles were required to obtain a corn population that produced seed starch having 80 to 91% amylose. From this latter corn population, randomly selected germplasm selections found to produce the highest seed starch amylose levels were used to construct genetic composite VJR-1.

Individual corn germplasm selections in the genetic composite which produce seed starch having the desired characteristics can be used to construct inbred lines and their subsequent hybrids capable of producing low amylopectin starch. Alternatively, the composite itself can be increased by means of open pollination, in isolation, to produce a source of high amylose starch. Seed increase of the composite by means of open pollination, in isolation, is shown in Example 1, below.

TEST METHODS

The following analytical methods were used to characterize the starches of this invention.

BUTANOL FRACTIONATION

The butanol fractionation methods of Adkins and Greenwood, *Carbohydrate Research*, 11:217-224 (1969) and Takeda, Hizukuri and Juliano, *Carbohydrate Research*, 148:299-308 (1986) were modified as described below and used to determine the amylose content of high amylose starches.

The starches were obtained from commercially available sources (i.e., corn, Hylon ® V corn (50% amylose) and Hylon VII corn (70% amylose) starches were obtained from National Starch and Chemical Company, Bridgewater, N.J.). Starches were also obtained by milling corn kernels from the experimental corn crops described in Example 1, below. All starches (except corn) were defatted by cold soxhlet extraction with ethanol overnight.

Part I: Starches were added to 90% DMSO in water under nitrogen and stirred for 1 ½ hours at 65° to 70° C. to solubilize the starch. Starch was recovered by adding ethanol, placing the sample under refrigeration (4° C.) for at least 1 hour under nitrogen, and centrifuging the sample at 10,000 g ("g" is the relative centrifugal force) at 4° C. for 10-15 minutes. This process was repeated three times with the starch precipitate.

Part II: Step 1: The precipitate was dispersed in DMSO, heated to 65° C. under nitrogen, and the complexing solution (an aqueous solution of 10% 1-butanol v/v and 0.1% NaCl v/w at 65° C.) was added with stirring to the starch/DMSO dispersion. The sample was slowly cooled to refrigeration temperature (4° C.) under nitrogen and centrifuged at 5,000 to 10,000 g for 10 to 15 minutes at 4° C.

Part II: Step 2: Immediately following centrifugation, the supernatant was decanted and the precipitate (the amylose-butanol complex) was re-dissolved in distilled water (about a 0.4% starch solution) at 65°-70° C. The re-dissolved precipitate was treated with 10% 1-butanol and 0.1% NaCl and left under refrigeration for at least 12 hours. The amylose fraction was recovered from the solution by centrifugation at 5,000 to 10,000 g for 10 to 15 minutes at 4° C. Step 2 of Part II was repeated.

The supernatant (from Part II) was treated with ethanol and/or acetone to precipitate the non-complexing starch components, refrigerated to cool to 4° C., and the supernatant was centrifuged at 10,000 g for 10 to 15 minutes at 4° C. The precipitate fractions (complexing and non-complexing) were dehydrated to a powder with an ethanol/acetone series under vacuum and oven dried at 60° C. under vacuum.

GEL PERMEATION CHROMATOGRAPHY

Starches were prepared for analysis by slurrying 10–15 mg of starch in 4 ml of dimethylsulfoxide (DMSO) containing 0.03M sodium nitrate and heating the slurry to 80° C. for 16 hours to disperse the starch. Samples (200 μl) were injected into an ALC/GPC-150C Chromatograph (Waters Associates, Milford, Mass.) (equipped with a Nelson 3000 Series Chromatography Data System and two PL gel mixed 10 um columns (Polymer Laboratory, Amherst, Mass.), employing DMSO containing 0.03M sodium nitrate as the mobile phase), and eluted at a rate of 1 ml/min. The columns were calibrated using dextran standards (with molecular weights of 2,000; 20,000; 80,000; 500,000; and 2,000,000, obtained from Pharmacia Fine Chemicals, Piscataway, N.J.). The percentage low molecular weight amylose was calculated from the relative area of the peak obtained within the molecular weight range from about 500 to 20,000; the percent amylose from the area of about 20,000 (in excess of 20,000 and less than 1,500,00) and the percent amylopectin from the area greater than 1,500,000.

IODINE ANALYSIS

COLORIMETRIC DETERMINATION

Approximately 0.2 grams of a starch (0.35 grams of a ground grain) sample was heated in 10 mls of concentrated calcium chloride (about 30% by weight) to 95° C. for 30 minutes. The sample was cooled to room temperature, diluted with 8.0 mls of dilute calcium chloride solution (about 12% by weight), mixed well, and then centrifuged for one minute at about 1800 rpm. The sample was then filtered to give a clear starch solution.

The starch concentration was determined polarimetrically using a 10 cm polarimeter cell. Exactly one ml of the sample was diluted to 50.0 mls with 12% calcium chloride, and 5.0 mls of that solution was added to a 100 mls volumetric flask with about 50 mls of 12% calcium chloride and 4.0 mls of iodine solution (0.008N iodine and 0.01N KI). The solution was brought to volume with 12% calcium chloride and shaken. The amount of amylose was determined by reading the % transmittance of the solution at 600 nm on a Spectronic 20 spectrophotometer using 4.0 mls of iodine solution diluted to 100 mls as the blank solution. Results were determined using a calibration curve prepared from samples of known amylose content.

POTENTIOMETRIC DETERMINATION

Approximately 0.5 g of a starch (1.0 g of a ground grain) sample was heated in 10 mls of concentrated calcium chloride (about 30% by weight) to 95° C. for 30 minutes. The sample was cooled to room temperature, diluted with 5 mls of a 2.5% uranyl acetate solution, mixed well, and centrifuged for 5 minutes at 2000 rpm. The sample was then filtered to give a clear solution.

The starch concentration was determined polarimetrically using a 1 cm polarimetric cell. An aliquot of the sample (normally 5 mls) was then directly titrated with a standardized 0.01N iodine solution while recording the potential using a platinum electrode with a KCl reference electrode. The amount of iodine needed to reach the inflection point was measured directly as bound iodine. The amount of amylose was calculated by assuming 1.0 gram of amylose will bind with 200 milligrams of iodine.

EXAMPLE 1

PRODUCTION OF GENETIC COMPOSITES VJR-1, VJR-2 AND VJR-3

Corn populations VJR-1, VJR-2 and VJR-3 were different generations of the same genetic material increased under open-pollinating conditions in isolated fields. The germplasm selections comprising the VJR-1 genetic composite were selected from the recurrent selection breeding program because they produced seed having the highest levels of starch amylose among a random sample of corn plants.

The genetic composite VJR-1 was grown during the winter of 1990–1991 under open-pollinating conditions in an isolated field in Florida. A total of 5 batches, each containing 4 bushels of shelled corn kernels from VJR-1 corn, were wet milled using the equipment and process described in R. W. Rubens, Cereal Foods world, 35:1166–1169 (1990), which is hereby incorporated by reference. The starch isolated from the VJR-1 corn kernels was subjected to chemical analysis.

Individual germplasm selections from VJR-1 are genetically stable with respect to the amylose content of the starch produced. The stability of this characteristic was ascertained by means of randomly selecting four different plants in the VJR-1 population as parents. An ear from each of these four plants was harvested and the amylose content of corn kernels from each ear was determined. In addition, seeds from these same ears were planted in a breeding nursery. The plants grown from these seeds were self-pollinated to produce progeny. The amylose content of the corn kernels produced by individual progeny was determined. The results are shown below.

| Parent   | Percent Amylose | Progeny   | Percent Amylose |
|----------|-----------------|-----------|-----------------|
| OD4231-1 | 86.9            | 1D2101-1  | 86.0            |
|          |                 | 1D2101-2  | 84.9            |
| OD4252-4 | 86.1            | 1D2165-1  | 87.5            |
|          |                 | 1D2165-2  | 85.0            |
| OD4239-2 | 82.6            | ID2113-1  | 91.1            |
|          |                 | ID2113-2  | 88.2            |
|          |                 | ID2113-3  | 86.5            |
| OD4241-3 | 83.9            | ID2117-1  | 85.6            |
|          |                 | ID2117-2  | 84.5            |

The results demonstrate that progeny produced by selfing individual germplasm selections from the VJR-1 population stably produce the starch amylose levels of the parent. Differences in amylose content between progeny produced by the same parent and between progeny and their respective parent are due to experimental error and differences in growing conditions in the breeding nursery. Thus, starch amylose content of individual germplasm selections within the genetic composite is a stable genetic characteristic of the selections.

Plants comprising genetic composite VJR-2 were grown from randomly selected seeds produced by the open-pollinated VJR-1 genetic composite. Genetic composite VJR-2 was grown under open-pollinating conditions in an isolated field in Illinois during the summer of 1991 under drought conditions. A total of 4 bushels of shelled corn kernels taken from VJR-2 were wet milled as described above. The starch isolated from the VJR-2 corn kernels was subjected to chemical analysis.

Plants comprising genetic composite VJR-3 were grown from randomly selected seeds produced by the open-pollinated VJR-2 genetic composite. Genetic composite VJR-3 was grown under open-pollinating conditions in an isolated field in Florida during the winter of 1991-1992. A total of 4 bushels of shelled corn kernels taken from VJR-3 were wet milled as described above. The starch isolated from the VJR-3 corn kernels was subjected to chemical analysis.

The starch amylopectin and amylose content and functional characteristics assayed were stable between VJR-1, VJR-2 and VJR-3 corn samples, relative to a 70% amylose corn control sample.

EXAMPLE 2

The testing methods described above were used to measure the amylopectin content of starch isolated from genetic composites VJR-1, VJR-2 and VJR-3 corn samples and control samples. Results are shown in Table I.

EXAMPLE 3

The testing methods described above were used to measure the amylose content of starch isolated from genetic composites VJR-1, VJR-2 and VJR-3 corn samples and control samples. The low molecular weight component of the non-complexing butanol fraction formed a color complex with iodine which was typical of amylose. Results are shown in Table IIA and IIB.

TABLE I

AMYLOPECTIN CONTENT OF STARCH

| Starch Sample | Amylopectin - Percent by Weight | |
|---|---|---|
| | Iodine Binding Total Starch[a] | GPC[c] of Non-Complexing Butanol Fraction |
| Corn[d] | 75.2 | — |
| High Amylose[d] (50%) | 42.9 | 46.0 ± 5.0 s.d. |
| High Amylose[b,d] (70%) | 29.4 | 32.4 |
| Low Amylopectin (VJR-1) | 13.1 | 2.9 ± 1.6 s.d. |
| Low Amylopectin (VJR-2) | 16.2 | 7.8 ± 2.0 s.d. |
| Low Amylopectin (VJR-3) | 11.0 | 1.0 ± 0.5 s.d. |

[a]Total starch amylopectin content was calculated as the remaining non-iodine binding starch fraction on a molar basis following potentiometric iodine analysis of amylose content.
[b]Sample was centrifuged at 1500 g and room temperature for 20 minutes to precipitate complex.
[c]Following butanol fractionation of the total starch, the non-complexing fractions were subjected to gel permeatino chromatography to determine the amylopectin content. Amylopectin percentages reflect the GPC peak occurring at a weight average molecular weight greater than 1,500,000.
[d]Commercially wet milled starch was obtained from National Starch and Chemical Company, Bridgewater, New Jersey.

TABLE IIA

AMYLOSE CONTENT BY IODINE ANAYLSIS

| Sample | Potentiometric % Amylose | | Colorimetric % Amylose | |
|---|---|---|---|---|
| Corn[b] | 25.0 | | 24.5 | — |
| Average | | 2.48 (±0.4) | | |
| Hylon V[a,b] | 56.9 | | 57.4 | 54.3 | 60.9 |
| Average | | 57.2 (±0.4) | | 57.6 (±1.4) |
| Hylon VII[a,b] | 70.6 | | 70.9 | 69.3 | 76.1 |
| Average | | 70.8 | | 72.2 (±1.5) |
| Low | 87.5 | | 87.6 | 85.0 | 83.9 |
| Amylopectin[c] | 88.9 | | 87.6 | 83.6 | 83.2 |
| (VJR-1) | 87.2 | | 87.3 | 81.9 | 81.7 |
| | 83.7 | | 85.0 | 84.3 | 85.1 |
| Average | | 86.9 (±1.3) | | 83.6 (±1.3) |
| Low | 84.7 | | 82.1 | 78.1 | 75.9 |
| Amylopectin[c] | 85.8 | | 83.3 | 78.6 | 78.3 |
| (VJR-2) | 85.4 | | 83.2 | 77.1 | 77.0 |
| | 83.8 | | 82.4 | 81.9 | 75.0 |
| Average | | 83.8 (±1.4) | | 77.7 (±2.1) |
| Low | 89.0 | | 86.6 | 79.5 | 81.4 |
| Amylopectin[c] | 90.6 | | 89.8 | 85.8 | 83.9 |
| (VJR-3) | 91.5 | | 87.3 | 83.2 | 85.4 |
| | 88.4 | | 88.9 | 85.2 | 84.3 |
| Average | | 89.0 (±1.6) | | 83.6 (±2.2) |

[a]Colorimetric averages for Hylon V and VII grain samples represent analysis of about 200 samples over a one year period, and the range reflects minimum and maximum values among grain samples. These analyses were used to construct a standard curve for colorimetric analysis of other starch or grain samples.
[b]Potentiometric analysis was carried out on the commercial lots of Hylon V and VII starches that are characterized in Table 1 and Example 4.
[c]Colorimetric analyses of low amylopectin starch samples were run against the Hylon V and VII starch standard curves.

TABLE IIB

AMYLOSE CONTENT BY BUTANOL FRACTIONATION/GPC ANAYLSIS

| | Amylose as a Percent by Weight of Total Starch | |
|---|---|---|
| Starch Sample[a] | Complexing Fraction[b] | Non-complexing Fraction[c] |
| Low Amylopectin (VJR-1) | 78.3 ± 9.1 s.d. | 18.7 ± 7.5 s.d. |
| Low Amylopectin (VJR-2) | 77.8 ± 8.1 s.d. | 14.4 ± 1.7 s.d. |
| Low Amylopectin (VJR-3) | 90.0 ± 2.0 s.d. | 9.0 ± 3.0 s.d. |

[a]Samples used for GPC analysis of amylose were the butanol-complexing and non-complexing fractions of the low amylopectin starches.
[b]The butanol complexing fraction of the starch eluted at a peak molecular weight of about 200,000 and represents normal amylose.
[c]The butanol non-complexing fraction of the starch eluted into two different molecular weight components. One component was the amylopectin fraction described in Table I. The other eluted at a molecular weight of about 15,000 and represents low molecular weight amylose.

EXAMPLE 4

The gelatinization temperature range and energy of gelatinization of the starches of this invention were measured by differential scanning calorimetry (DSC).

Measurements were made on Perkin-Elmer DSC-4 instrument (Perkin-Elmer Co., Piscataway, N.J.) using a scan range of 25° to 160° C. at 10° C./minute and a 4:1 water:starch ratio, by weight.

Immediately after cooling from the first scan, samples were run through the same test to measure the energy of complexation with fatty acids. This ΔH was subtracted from the ΔH of the first scan to arrive at the ΔH number in Table III.

The low amylopectin and the 70% amylose starch samples were refrigerated for at least 7 days to permit amylopectin reassociation and tested for gelatinization properties as described above. In the 70% amylose starch sample a peak occurred at 60° C. that was typical of amylopectin disassociation. This peak was absent from the low amylopectin starch samples, indicating that these samples were free of significant amounts of amylopectin.

The results are shown in Table III.

TABLE III

GELATINIZATION CHARACTERISTICS OF STARCH

| Sample | Temperature (°C.) | | Energy |
|---|---|---|---|
| | Low | High | ΔH (cal/gram) |
| Corn[a] | 71.74 | – 88.15 | 3.33 |
| | 71.38 | – 86.43 | 3.36 |

TABLE III-continued
GELATINIZATION CHARACTERISTICS OF STARCH

| Sample | Temperature (°C.) Low | | High | Energy Δ H (cal/gram) |
|---|---|---|---|---|
| | 70.98 | – | 86.03 | 3.43 |
| | 71.88 | – | 87.23 | 3.07 |
| Mean | 71.50 | – | 86.96 | 3.30 |
| | (±0.40) | | (±0.94) | (±0.16) |
| Waxy Maize[a] | 66.42 | – | 88.91 | 3.79 |
| | 67.42 | – | 89.98 | 3.75 |
| | 66.46 | – | 88.20 | 3.47 |
| | 66.58 | – | 89.09 | 3.52 |
| | 65.48 | – | 88.38 | 3.59 |
| Mean | 66.47 | – | 88.91 | 3.59 |
| | (±0.69) | | (±0.70) | (±0.14) |
| High Amylose[a] (50%) | 69.37 | – | 104.02 | 2.81 |
| | 68.72 | – | 102.35 | 2.56 |
| | 68.72 | – | 105.09 | 2.76 |
| | 68.84 | – | 104.73 | 3.07 |
| | 69.03 | – | 103.84 | 3.02 |
| | 68.94 | – | 104.01 | 2.84 |
| Mean | (±0.27) | | (±1.05) | (±0.21) |
| High Amylose[a] (70%) | 68.80 | – | 110.15 | 2.56 |
| | 69.89 | – | 111.04 | 2.40 |
| | 70.47 | – | 110.33 | |
| | 68.59 | – | 109.44 | 1.99 |
| Mean | 69.44 | – | 110.24 | 2.32 |
| | (±0.77) | | (±0.66) | (±.029) |
| Low Amylopectin (VJR-1) | 74.57 | – | 128.04 | 2.43 |
| | 75.98 | – | 134.16 | 2.61 |
| | 75.80 | – | 142.55 | 3.16 |
| | 73.68 | – | 138.32 | 3.66 |
| | 74.37 | – | 134.70 | 2.14 |
| | 74.37 | – | 136.13 | 3.21 |
| | 76.33 | – | 138.80 | 3.27 |
| Mean | 75.01 | | 136.10 | 2.92 |
| | (±1.01) | | (±4.56) | (±0.54) |
| Low Amylopectin (VJR-2) | 75.80 | – | 127.74 | 2.38 |
| | 76.03 | – | 113.71 | 1.74 |
| | 75.09 | – | 115.96 | 1.72 |
| | 77.58 | – | 125.06 | 2.12 |
| | 76.16 | – | 127.02 | 2.24 |
| | 75.44 | – | 113.64 | 1.77 |
| Mean | 76.02 | – | 120.52 | 2.00 |
| | (±0.86) | | (±6.77) | (±0.29) |
| Low Amylopectin (VJR-3) | 75.32 | – | 135.19 | 2.86 |
| | 74.01 | – | 134.70 | 3.23 |
| | 75.32 | – | 136.16 | 2.22 |
| | 74.84 | – | 135.73 | 2.84 |
| | 74.73 | – | 138.27 | |
| | 75.24 | – | 137.53 | 2.64 |
| | 75.31 | – | 136.19 | 2.66 |
| Mean | 74.97 | | 136.25 | 2.74 |
| | (±0.49) | | (±1.26) | (±0.33) |

[a] A commercial granular starch that was obtained from National Starch and Chemical Company, Bridgewater, New Jersey.

The results show that the low amylopectin starch has a longer gelatinization temperature range (about 75° C. to 130° C.) and a higher final gelatinization temperature than corn (about 62° C. to 70° C.), waxy maize (about 65° C. to 89° C.), or high amylose (70%) corn (about 75° C. to 110° C.) starches.

The energy required to gelatinize the starch (ΔH (cal/gram)) was more for the low amylopectin starches (about 2.7 to 2.9) than for high amylose (70%) corn starch (about 2.32) and less than waxy maize starch (about 3.6). This indicates that low amylopectin starches have a unique crystal structure within the starch granule compared to known corn starches.

EXAMPLE 5

The rheological properties of the low amylopectin starches were measured using a Rheometrics RFS-II Fluids Spectrometer and compared to the rheological properties of known high amylose starch.

The rheological analysis was conducted by jet-cooking the starch at 138°–149° C. (280° to 300° F.) and maintaining the resulting starch dispersion at 95° C. until ready for analysis. The parallel plates of the rheometer were heated to 60° C. The starch was loaded, and the plates were cooled to 25° C. for testing. The plate gap was set at 1.5 mm, with 1% strain and the frequency was 1 radian per second. Silicon oil was applied to the edge of the gel to prevent moisture loss during testing. Results are shown in Table IV and in FIG. 1.

TABLE IV
RHEOLOGICAL ANALYSIS OF STARCH GELS

| Sample | Percent Solids | G' Max |
|---|---|---|
| High Amylose (70%) | 4.00 | 30,600 |
| | 5.00 | 61,800 |
| | 6.00 | 106,000 |
| Low Amylopectin (VJR-1) | 2.99 | 10,300 |
| | 3.99 | 52,000 |
| | 4.96 | 103,000 |
| | 5.70 | 225,000 |
| | 5.95 | 292,000 |
| | 5.99 | 300,000 |
| Low Amylopectin (VJR-2) | 2.96 | 9,600 |
| | 4.30 | 68,100 |
| | 5.00 | 120,900 |
| | 5.93 | 226,700 |
| Low Amylopectin (VJR-3) | 4.05 | 54,200 |
| | 4.98 | 189,000 |
| | 5.85 | 341,000 |

FIG. 1 shows G' measurements in dyn/cm$^2$ versus time in minutes (from 0 to 240 minutes) for high amylose (70%) corn starch at 6% solids ("Hylon VII") and low amylopectin starches VJR-1, VJR-2, and VJR-3 at, respectively, 5.95, 5.93 and 5.85% solids. As shown in FIG. 1, the time required for low amylopectin starch to gel was significantly shorter and gelling occurred more sharply (about 24 versus 72 minutes) over time than for a high amylose (70%) corn starch. The ultimate gel strength and stiffness measurements were higher for VJR-1, 2 and 3, than for the 70% amylose control. The VJR-1, 2 and 3 starch gels exhibited a very stable storage modulus (G') after the maximum G' measurement had been reached. The G' maximum for VJR-1, 2 and 3 starch gels was reached within 20 hours. In contrast, the control starch gel showed a gradual increase in G' and did not reach a stable G' maximum within the 20 hour measurement period.

As shown in Table IV, the gel stiffness and resiliency (G' max) for low amylopectin starches at the same solids range (i.e., 4–6% solids at 25° C.) was greater than that of the high amylose starch control.

EXAMPLE 6

The gel strength of low amylopectin starches in aqueous dispersion was compared to that of known corn starches using a Stevens Texture Analyzer (Texture Technology Corporation) set at penetration speed of 0.5 mm/sec with a 0.5 inch diameter probe. Starches were dispersed in water at 3 to 6.5% solids by jet-cooking at 138°–149° C. (280°–300° F.) and tested after 24 hours at room temperature. Results are shown in Table V. Results show that low amylopectin starches have significantly higher gel strength in aqueous dispersion than high amylose (70%) corn starch. The low amylopectin starch gels (having at least 6% starch solids) did not exhibit syneresis under refrigeration over a five month period. In contrast, the 70% amylose starch gel exhibited syneresis within days of refrigerated storage.

weight greater than one million (corresponding to amylopectin) in the VJR-1 sample, nor in the high amylose

TABLE V
GEL STRENGTH OF LOW AMYLOPECTIN STARCH

| Sample | Gel Strength (g/cm$^2$) | | | | | | | |
|---|---|---|---|---|---|---|---|---|
| % Solids | 3.0 | 3.5 | 4.0 | 4.5 | 5.0 | 5.5 | 6.0 | 6.5 |
| High Amylose |  | 32 | 95 | 168 | 221 | 268 | 365 | 541 |
| (70%) |  | 35 | 99 | 150 | 222 | 314 | 386 | 510 |
|  |  | 35 | 100 | 165 | 238 | 305 | 392 | 492 |
|  |  |  |  | 150 | 243 | 268 | 365 | 541 |
|  |  |  |  | 151 | 238 | 314 | 386 | 510 |
|  |  |  |  | 155 | 245 | 305 | 392 | 492 |
|  |  |  |  | 150. | 243 |  | 355 |  |
|  |  |  |  | 151 | 238 |  | 385 |  |
|  |  |  |  | 155 | 245 |  |  |  |
| Mean |  | 34 | 98 | 155 | 237 | 296 | 378 | 514 |
|  |  | (±2) | (±3) | (±7) | (±9) | (±22) | (±14) | (±22) |
| Low Amylopectin | 58 | 119 | 174 | 279 | 350 | 501 | 640 | 751 |
| (VJR-1) | 51 | 100 | 170 | 244 | 368 | 438 | 641 | 749 |
|  | 52 | 114 | 174 | 270 | 360 | 528 | 631 | 820 |
| Mean | 54 | 111 | 173 | 264 | 359 | 489 | 637 | 773 |
|  | (±4) | (±10) | (±2) | (±18) | (±9) | (±46) | (±6) | (±40) |
| Low Amylopectin | 85 | 137 | 221 | 331 | 449 | 610 | 685 |  |
| (VJR-2) | 73 | 133 | 214 | 325 | 450 | 604 | 677 |  |
|  | 75 | 131 | 216 | 332 | 454 | 605 | 680 |  |
| Mean | 78 | 134 | 217 | 329 | 451 | 606 | 681 |  |
|  | (±6) | (±3) | (±4) | (±4) | (±3) | (±3) | (±4) |  |
| Low Amylopectin | 51 | 120 | 185 | 296 | 418 | 600 | 715 | 899 |
| (VJR-3) | 50 | 109 | 184 | 286 | 400 | 539 | 700 | 870 |
|  | 58 | 112 | 191 | 300 | 421 | 610 | 795 | 869 |
| Mean | 53 | 114 | 187 | 294 | 413 | 583 | 715 | 870 |
|  | (±4) | (±6) | (±4) | (±7) | (±11) | (±38) | (±51) | (±17) |

EXAMPLE 7

The low amylopectin starch granule structures were studied microscopically and compared to known corn starches.

Light and scanning electron microscope studies showed the low amylopectin starch granules to be more irregular and elongated than known corn starch granules, including high amylose (70%) corn starch. Similar characteristics were observed in each low amylopectin corn crop described in Example 1, herein. Granules also displayed very little birefringence. Because birefringence is most distinct in waxy maize starch (i.e., essentially all amylopectin) the near absence of birefringence in the experimental starches confirms the near absence of amylopectin that was observed chemically.

EXAMPLE 8

A debranching enzyme, isoamylase (a 1,6-α-D-glucosidase, Lot No. 01101, obtained from Hayashibara Shoji Inc., Okayama, Japan) was used to hydrolyze the branch points (1,6) of the low amylopectin starches of Example 1. The degradation products were compared to those obtained by debranching known corn starches (waxy maize and high amylose (70%) corn starch).

Starch examples were prepared by the method of Hizukuri, et al., *Carbohydrate Research*, 94:205-213 (1981).

Following enzyme treatment, the molecular weight of the starch products was measured by gel permeation chromatography. Waxy maize was completely debranched to lower molecular weight fractions (two poorly resolved GPC peaks corresponding to a DP of about 15 and about 60). For the low amylopectin starch extracted from the VJR-1 corn sample of Example 1, two molecular weight fractions were observed: at about 21,000 molecular weight (an anhydroglucose DP of about 130) and at about 145,000 molecular weight (a DP of about 895). No peak was observed at a molecular weight greater than one million (corresponding to amylopectin) in the VJR-1 sample, nor in the high amylose (70%) corn starch control. The VJR-1 high molecular weight peak (corresponding to normal amylose) was 10% higher than the same molecular weight peak observed in the high amylose (70%) corn starch control.

Thus, enzyme analysis confirms that the low amylopectin corn starch contains significantly more amylose, and less branched component, than the most closely related corn starch, a 70% amylose starch.

Now that the preferred embodiments of the present invention have been described in detail, various modifications and improvements thereon will become readily apparent to those skilled in the art. Accordingly the spirit and scope of the invention are to be limited only by the appended claims and not by the foregoing specification.

We claim:

1. A substantially pure starch extracted from a plant source having an amylose extender genotype, the starch comprising less than 10% amylopectin determined by butanol fractionation/exclusion chromatography measurement.

2. The starch of claim 1, wherein the starch comprises less than 5% amylopectin.

3. The starch of claim 1, wherein the starch comprises at least 75% amylose.

4. The starch of claim 1, wherein the starch further comprises 8 to 25% of a substantially linear polymer containing from about 30 to 250 anhydroglucose units substantially linked by alpha-1,4-D-glucosidic bonds determined by butanol fractionation/exclusion chromatography measurement.

5. A gel, comprising water and an effective amount of a substantially pure starch extracted from a plant source having an amylose extender genotype, the starch comprising less than 10% amylopectin determined by butanol fractionation/exclusion chromatography measurement, characterized in that the gel is stable, and is formed at a faster rate and to a higher gel strength and stiffness than a gel comprising water and the same amount of a 70% amylose starch.

6. A substantially pure starch extracted from a plant source having an amylose extender genotype, the starch comprising at least 75% amylose determined by butanol fractionation/exclusion chromatography measurement.

7. The starch of claim 6, wherein the starch comprises at least 85% amylose.

8. The starch of claim 6, wherein the starch further comprises 8 to 25% low molecular weight amylose determined by butanol fractionation/exclusion chromatography measurement.

9. A gel, comprising water and an effective amount of a substantially pure starch extracted from a plant source having an amylose extender genotype, the starch comprising at least 75% amylose determined by butanol fractionation/exclusion chromatography measurement, characterized in that the gel is stable, and is formed at a faster rate and to a higher gel strength and stiffness than a gel comprising water and the same amount of a 70% amylose starch.

10. A substantially pure starch extracted from the grain of a plant having a recessive amylose extender genotype that is associated with amylose extender modifier genes, the starch comprising less than 10% amylopectin determined by butanol fractionation/exclusion chromatography measurement.

11. The starch of claim 10, wherein the starch comprises at least 85% amylose.

12. The starch of claim 10, wherein the starch comprises at least 75% amylose.

13. The starch of claim 10, wherein the starch comprises less than 5% amylopectin.

14. The starch of claim 10, wherein the starch further comprises 8 to 25% of a substantially linear polymer containing from about 30 to 250 anhydroglucose units substantially linked by alpha-1,4-D-glucosidic bonds determined by butanol fractionation/exclusion chromatography measurement.

15. The starch of claim 10, wherein the starch bearing plant is *Zea mays* L.

16. A gel comprising water and an effective amount of a substantially pure starch extracted from the grain of a plant having a recessive amylose extendrer genotype that is associated with amylose extender modifier genes, the starch comprising less than 10% amylopectin determined by butanol fractionation/exclusion chromatography measurement, characterized in that the gel is stable, and is formed at a faster rate and to a higher gel strength and stiffness than a gel comprising water and the same amount of a 70% amylose starch.

17. A starch composition comprising:
   a) at least 75% amylose;
   b) less than 10% amylopectin; and
   c) 8 to 25% of a substantially linear polymer containing from about 30 to 250 anhydroglucose units substantially linked by alpha-1,4-D-glucosidic bonds determined by butanol fractionation/exclusion chromatography measurement.

18. The starch composition of claim 17, wherein the composition is a blend of two or more starch fractions.

19. The starch composition of claim 17, wherein the composition is obtained from a plant source having an amylose extender genotype.

20. A gel, comprising water and an effective amount of a starch composition comprising:
   a) at least 75% amylose;
   b) less than 10% amylopectin; and
   c) 8 to 25% of a substantially linear polymer containing about from 30 to 250 anhydroglucose units substantially linked by alpha-1,4-D-glucosidic bonds, determined by butanol fractionation/exclusion chromatography measurement, characterized in that the gel is stable, and is formed at a faster rate and to a higher gel strength and stiffness than a gel comprising water and the same amount of a 70% amylose starch.

* * * * *

REEXAMINATION CERTIFICATE (2743th)

United States Patent [19]
Fergason et al.

[11] B1 5,300,145
[45] Certificate Issued Nov. 28, 1995

[54] LOW AMYLOPECTIN STARCH

[75] Inventors: Virgil Fergason, Decatur, Ill.; Roger Jeffcoat, Bridgewater, N.J.; John E. Fannon, Somerville, N.J.; Teresa Capitani, Clark, N.J.

[73] Assignee: National Starch and Chemical Investment Holding Corporation, Wilmington, Del.

Reexamination Request:
No. 90/003,858, Jun. 2, 1995

Reexamination Certificate for:
Patent No.: 5,300,145
Issued: Apr. 5, 1994
Appl. No.: 937,794
Filed: Aug. 28, 1992

[51] Int. Cl.$^6$ .............. C08L 3/02; C09D 103/02
[52] U.S. Cl. .............. 106/213; 106/210; 536/102; 127/29; 127/65
[58] Field of Search .............. 106/210, 213; 536/102; 127/29, 65

[56] References Cited

U.S. PATENT DOCUMENTS 4,726,957  2/1988  Lacourse .............. 426/578

OTHER PUBLICATIONS

Senti, F. R. and Russell, C. R. "High Amylose Cornstarch–Properties and Prospects" Tappi, vol. 43, No. 4, (Apr. 1960), pp. 343–349.

Zuber, M. S. "Genetic Control of Starch Development", Whistler and Paschall, Starch Chemistry and Technology (Academic Press 1965) vol. I, pp. 43–63.

Senti, F. R. "High Amylose Corn Starch: Its Production, Properties, and Uses", Whistler and Paschall, Starch Chemistry and Technology (Academic Press 1967), vol. 11, pp. 499–522.

Whistler, R. L., Paschall, E. F., and BeMiller, J. N., Starch Chemistry and Technology (Academic Press 1984), 2nd Edition, pp. 7, 56, 251, 252, and 579.

Sprague, G. F. and Dudley, J. W., Corn and Corn Improvement (1988) Third Edition, pp. 911–912.

Hullinger, C. H., VanPatten, E. and Freck, J. A. "Food Applications of High Amylose Starches" Food Technology (Mar. 1973), pp. 22 and 24.

*Primary Examiner*—David Brunsman

[57] ABSTRACT

This invention provides a starch derived from a single plant source, comprising less than 10%, optionally less than 5%, amylopectin. The starch additionally comprises at least 75% amylose, optionally at least 85% amylose, measured by butanol fractionation/exclusion chromatography measurement. In another aspect of this invention, the starch is extracted in substantially pure form from a starch bearing plant having a recesssive amylose extender genotype that is associated with amylose extender modifying genes. The starch bearing plant from which the starch is extracted is preferably a maize plant.

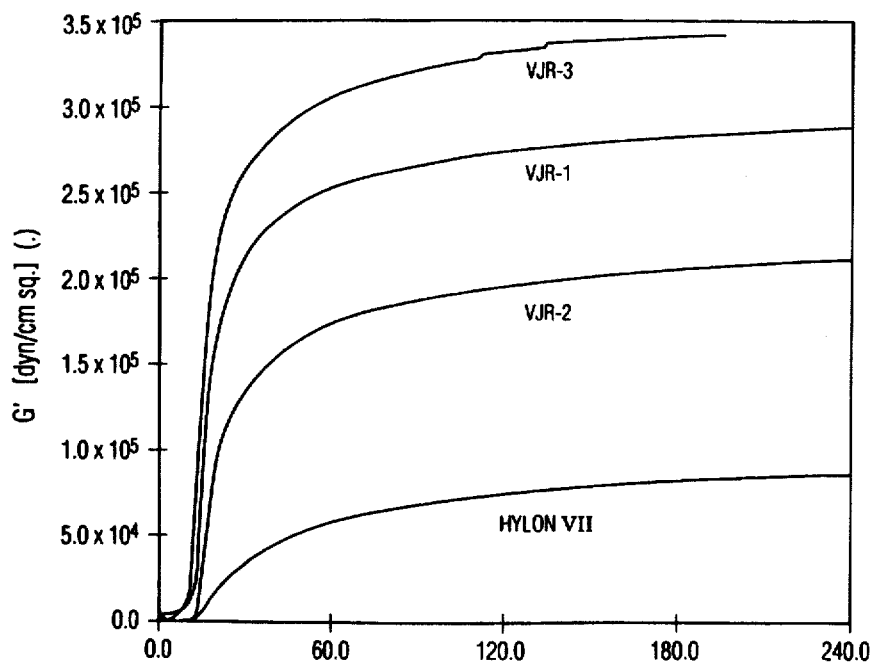

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *